(12) United States Patent
Nolen et al.

(10) Patent No.: US 11,338,524 B1
(45) Date of Patent: May 24, 2022

(54) METHOD OF FORMING A FOLDABLE OR COLLAPSIBLE PLASTIC AND/OR COMPOSITE UTILITY ENCLOSURE

(71) Applicants: Dustin Kyle Nolen, Mount Olive, AL (US); Raymond George Thompson, Hoover, AL (US)

(72) Inventors: Dustin Kyle Nolen, Mount Olive, AL (US); Raymond George Thompson, Hoover, AL (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 17/223,089

(22) Filed: Apr. 6, 2021

Related U.S. Application Data

(63) Continuation-in-part of application No. 16/663,391, filed on Oct. 25, 2019, now Pat. No. 11,008,134.
(Continued)

(51) Int. Cl.
*B29C 65/56* (2006.01)
*B65D 6/16* (2006.01)
(Continued)

(52) U.S. Cl.
CPC ............ *B29C 65/565* (2013.01); *B29C 70/54* (2013.01); *B65D 11/18* (2013.01);
(Continued)

(58) Field of Classification Search
CPC .......... B29C 45/0017; B29C 45/14754; B29C 2045/002; B29C 2045/0024;
(Continued)

(56) References Cited

U.S. PATENT DOCUMENTS 533,750 A    2/1895  Ross
941,014 A   11/1909  Doble
(Continued)

FOREIGN PATENT DOCUMENTS

CA      2345843 C     10/2002
DE   102005016491 B4  10/2006
(Continued)

OTHER PUBLICATIONS

Search Report for International Patent Application No. PCT/US2021/13500 dated Apr. 5, 2021; 1 page

*Primary Examiner* — Benjamin A Schiffman
(74) *Attorney, Agent, or Firm* — Dority & Manning, P.A.

(57) ABSTRACT

A method of forming and assembling a foldable plastic utility enclosure using molds to form sides of the enclosure, preferably using glass fiber-reinforced thermoplastic composite. The molds are constructed to form a central hole in hinge members which are formed on ends of the sides. The central hole of the hinge member is molded with two molding parts, wherein one or both of the molding parts have a solid central portion that forms the central hole. The sides are removed from the molds after curing and the sides are assembled to form the utility enclosure while the sides are still hot from the molding process. Hinge pins are inserted into the central holes of the hinge members to form hinges and to prevent the sides from warping during cooling. Assembling the sides and inserting hinge pins to form the utility enclosure is completed within approximately 10 minutes after removing the sides from the molds.

18 Claims, 9 Drawing Sheets

Related U.S. Application Data

(60) Provisional application No. 62/751,278, filed on Oct. 26, 2018.

(51) Int. Cl.
| | | |
|---|---|---|
| *B29C 70/54* | (2006.01) | |
| *B65D 6/18* | (2006.01) | |
| *B65D 6/34* | (2006.01) | |
| *B29K 23/00* | (2006.01) | |
| *B29K 309/08* | (2006.01) | |
| *B29L 31/10* | (2006.01) | |
| *B29C 45/00* | (2006.01) | |
| *B29C 65/00* | (2006.01) | |
| *B29C 45/14* | (2006.01) | |
| *B29L 31/00* | (2006.01) | |
| *B29L 31/22* | (2006.01) | |

(52) U.S. Cl.
CPC .......... *B65D 11/1846* (2013.01); *B65D 11/22* (2013.01); *B29C 45/0017* (2013.01); *B29C 45/14754* (2013.01); *B29C 66/549* (2013.01); *B29K 2023/12* (2013.01); *B29K 2309/08* (2013.01); *B29L 2031/10* (2013.01); *B29L 2031/22* (2013.01); *B29L 2031/7134* (2013.01)

(58) Field of Classification Search
CPC ..... B29C 65/564; B29C 66/549; B29C 70/54; B29L 2031/22; B29L 2031/7134; B29L 2031/10; B65D 11/1846; B65D 11/18; B65D 11/22; E04B 1/34336; E04B 1/34321; E04B 1/344; E04B 1/34384; E04B 1/34357; E04B 2103/12; B29K 2023/12
USPC ........................................................ 264/242
See application file for complete search history.

(56) References Cited

U.S. PATENT DOCUMENTS

| | | | |
|---|---|---|---|
| 1,279,083 A | 9/1918 | Thweatt | |
| 1,441,343 A | 1/1923 | Derick | |
| 2,555,754 A * | 6/1951 | Morin | B22C 9/30 |
| | | | 264/242 |
| 2,941,710 A | 6/1960 | Smith | |
| 3,000,049 A * | 9/1961 | Terry, Jr. | E05D 9/005 |
| | | | 16/334 |
| 3,164,281 A | 1/1965 | Wiliam, Jr. | |
| 3,321,565 A * | 5/1967 | Peterson | B29C 65/565 |
| | | | 264/162 |
| 3,631,584 A * | 1/1972 | Walkup | B29C 66/8242 |
| | | | 29/434 |
| 3,968,601 A | 7/1976 | Brown | |
| D245,102 S | 7/1977 | Gross | |
| 4,163,503 A | 8/1979 | McKinnon | |
| 4,265,365 A | 5/1981 | Boteler | |
| 4,266,670 A | 5/1981 | Mykleby | |
| 4,579,709 A * | 4/1986 | Ferreri | B29C 45/0017 |
| | | | 264/242 |
| 4,809,402 A * | 3/1989 | Rainville | B29C 69/003 |
| | | | 16/372 |
| 4,820,383 A * | 4/1989 | Shchamorov | B65D 11/1846 |
| | | | 220/6 |
| 4,863,059 A | 9/1989 | Christensen | |
| 5,288,453 A * | 2/1994 | Rutenbeck | B29C 49/0047 |
| | | | 16/DIG. 13 |
| 5,462,383 A | 10/1995 | Pieter | |
| 6,138,851 A | 10/2000 | Townson | |
| 6,261,499 B1 * | 7/2001 | Okeke | B29C 45/0017 |
| | | | 264/242 |
| 6,269,966 B1 * | 8/2001 | Pallo | A45C 13/005 |
| | | | 220/592.25 |
| 6,325,962 B1 * | 12/2001 | Kmiecik | B29C 49/4802 |
| | | | 264/515 |
| D478,672 S | 8/2003 | Charlebois | |
| 6,669,044 B2 | 12/2003 | Murakami | |
| 6,749,080 B1 | 6/2004 | White | |
| 6,861,584 B2 | 3/2005 | Hutchin | |
| 7,030,315 B1 | 4/2006 | Dunn | |
| 7,115,311 B2 | 10/2006 | Arthurs | |
| 7,163,352 B2 | 1/2007 | Jurich | |
| 7,234,275 B1 | 6/2007 | Haggy | |
| 7,320,768 B2 * | 1/2008 | Eimura | B29C 45/0017 |
| | | | 264/242 |
| 7,381,888 B2 | 6/2008 | Burke | |
| 7,385,137 B2 | 6/2008 | Burke | |
| 7,406,240 B2 | 7/2008 | Murano | |
| 7,501,573 B2 | 1/2009 | Balfour, Jr. | |
| 7,513,385 B2 | 4/2009 | Flynn | |
| 7,633,742 B2 | 12/2009 | Standish | |
| 7,802,402 B2 | 9/2010 | Skaggs | |
| 7,807,923 B2 | 10/2010 | Moran | |
| 7,880,641 B2 | 2/2011 | Parris | |
| 7,959,846 B2 * | 6/2011 | White | E05D 9/005 |
| | | | 264/342 R |
| 8,096,439 B2 | 1/2012 | Fogerlie | |
| 8,249,411 B2 | 8/2012 | Burke | |
| 8,261,410 B2 * | 9/2012 | Sze | B29C 49/48 |
| | | | 16/266 |
| 8,302,796 B1 | 11/2012 | Johnson | |
| 8,307,604 B2 | 11/2012 | Stepanian | |
| 8,336,847 B2 * | 12/2012 | Abate | B29C 45/0017 |
| | | | 249/58 |
| 8,534,484 B2 | 9/2013 | Rost | |
| 8,561,641 B2 | 10/2013 | Ogden | |
| D693,908 S | 11/2013 | Rost | |
| D693,909 S | 11/2013 | Rost | |
| 8,686,909 B2 | 4/2014 | Frank | |
| 8,847,070 B2 | 7/2014 | Burke | |
| 8,796,548 B2 | 8/2014 | Rost | |
| 9,265,162 B2 | 2/2016 | Kang | |
| 9,287,693 B2 | 3/2016 | Burke | |
| 9,768,592 B2 | 2/2017 | Unger | |
| 9,809,960 B2 | 3/2017 | Wiley | |
| 9,876,340 B2 | 1/2018 | Unger | |
| 9,917,427 B2 | 3/2018 | Rost | |
| 10,132,052 B2 | 11/2018 | Dang | |
| 10,136,530 B2 | 11/2018 | Dang | |
| D841,279 S | 2/2019 | Freeman | |
| 10,232,978 B2 * | 3/2019 | Chinni Vergottini | |
| | | | B65D 11/1866 |
| 10,256,616 B1 | 4/2019 | Schweinberg | |
| 10,305,268 B2 | 5/2019 | Unger | |
| 10,428,487 B2 | 10/2019 | Cassidy | |
| 10,479,563 B2 | 11/2019 | Tramm | |
| 10,547,168 B2 | 1/2020 | Tipton | |
| 10,804,644 B2 | 4/2020 | Cretella | |
| 10,656,363 B2 | 5/2020 | Elford | |
| 10,840,682 B2 | 11/2020 | Tipton | |
| 11,008,134 B2 * | 5/2021 | Nolen | G01F 15/14 |
| 11,008,728 B2 | 5/2021 | Turner | |
| 11,014,705 B2 | 5/2021 | Strange | |
| 11,040,800 B2 | 6/2021 | Mcdade | |
| 11,046,480 B2 | 6/2021 | Mccrea | |
| 11,050,229 B2 | 6/2021 | Baker | |
| 11,059,666 B2 | 7/2021 | Lanigan | |
| 11,066,802 B1 * | 7/2021 | Nolen | E02D 29/00 |
| 11,072,904 B2 | 7/2021 | Chudley | |
| 2007/0158345 A1 | 7/2007 | Booth | |
| 2008/0134466 A1 * | 6/2008 | Massengill | B29C 45/0081 |
| | | | 16/222 |
| 2010/0055389 A1 * | 3/2010 | Allore | H04M 1/026 |
| | | | 428/119 |
| 2010/0175904 A1 | 7/2010 | Hebert | |
| 2012/0228302 A1 | 9/2012 | Brian | |
| 2018/0100284 A1 | 4/2018 | Isaacson | |
| 2019/0345740 A1 | 11/2019 | Fisher | |
| 2020/0018102 A1 * | 1/2020 | Lindberg | B29C 45/0017 |
| 2020/0122886 A1 | 4/2020 | Barlier | |

(56) References Cited

U.S. PATENT DOCUMENTS

| | | | |
|---|---|---|---|
| 2020/0386023 A1* | 12/2020 | Larson | E05D 11/082 |
| 2021/0086979 A1 | 3/2021 | Guerdrum | |
| 2021/0171237 A1 | 6/2021 | Hsu | |

FOREIGN PATENT DOCUMENTS

| | | |
|---|---|---|
| DE | 102005037997 A1 | 2/2007 |
| DE | 202020000904 U1 | 6/2021 |
| EM | D210289 | 8/2020 |
| EP | 1515409 B1 | 3/2005 |
| EP | 1461259 B1 | 8/2006 |
| EP | 2166392 B1 | 3/2010 |
| EP | 2166393 B1 | 3/2010 |
| EP | 2177668 A2 | 4/2010 |
| EP | 2357284 B1 | 8/2011 |
| EP | 2604758 B1 | 6/2013 |
| EP | 2607938 B1 | 6/2013 |
| EP | 2631370 B1 | 8/2013 |
| EP | 2738584 B1 | 6/2014 |
| EP | 2878734 B1 | 6/2015 |
| EP | 3029218 B1 | 6/2016 |
| EP | 3300196 B1 | 3/2018 |
| EP | 3483343 A1 | 5/2019 |
| EP | 3536860 A1 | 9/2019 |
| EP | 3567688 A1 | 11/2019 |
| FR | 2933993 B1 | 1/2010 |
| GB | 2324324 B | 10/1998 |
| GB | 2394968 B | 5/2004 |
| GB | 2404409 B | 2/2005 |
| GB | 2436341 B | 9/2007 |
| GB | 2450930 B | 1/2009 |
| GB | 2520784 A | 6/2015 |
| GB | 2576181 A | 2/2020 |
| GB | 2576444 A | 2/2020 |
| WO | WO2015107355 A2 | 7/2015 |
| WO | WO2016022481 A1 | 2/2016 |
| WO | WO2016168497 A1 | 10/2016 |
| WO | WO2020011334 A1 | 1/2020 |
| WO | WO2020072736 A1 | 4/2020 |
| WO | WO2021042950 A1 | 3/2021 |
| WO | WO2021107628 A1 | 6/2021 |

* cited by examiner

METHOD OF FORMING A FOLDABLE OR COLLAPSIBLE PLASTIC AND/OR COMPOSITE UTILITY ENCLOSURE

CROSS-REFERENCE TO RELATED APPLICATION

This application is a continuation in part of U.S. patent application Ser. No. 16/663,391, filed on Oct. 25, 2019, the contents of that application being incorporated herein by reference in its entirety.

FIELD OF THE INVENTION

The invention relates to underground utility enclosures for providing protection for below ground devices such as water meters, valves, telecom hardware, and the like and, more particularly, to a foldable and/or collapsible plastic/composite utility enclosure.

BACKGROUND OF THE INVENTION

Utility enclosures are used to protect buried meters, valves, and telecom hardware and need to be capable of withstanding heavy loads that may be placed on the cover of the utility enclosure. Concrete utility enclosures are commonly used in or near roadways and driveways since they are heavy duty and are capable of withstanding heavy loads placed on the cover. Concrete utility enclosures are formed by a wall of concrete that extends around the utility. A lip extends about the top of the utility enclosure in the interior of the utility enclosure. The cover of the utility enclosure fits into the interior of the utility enclosure and rests on the lip. The concrete lip provides sufficient support to the cover to enable the utility enclosure to withstand the force of heavy loads.

Concrete utility enclosures present some disadvantages, however. Concrete utility enclosures are difficult to transport and install. They are bulky and take up space. During transport, concrete utility enclosures are prone to being chipped, and significant amounts of concrete utility enclosures become non-usable because of damage incurred in transport. Installation of concrete utility enclosures is difficult because of the weight of the utility enclosures. Installation of a concrete utility enclosure generally requires the effort of two people because the utility enclosures weigh in excess of two hundred pounds each. The weight of the concrete utility enclosures also presents some danger of physical injury to the persons installing the utility enclosure.

Plastic utility enclosures are known. U.S. Pat. No. 5,333, 750 discloses a plastic utility enclosure that is durable, lightweight, and capable of being located in roadways or driveways and withstanding heavy loads. However, plastic utility enclosures also are bulky and take up space during transportation. What is needed is a foldable utility enclosure that takes up reduced space when folded.

SUMMARY OF THE INVENTION

This invention is a foldable plastic/composite utility enclosure having a first side, a second side opposite the first side, a third side, and a fourth side opposite the third side. Each of the sides has a first end and a second opposite end. The first end of the first side is connected to the first end of the third side by means of a first hinge. The second opposite end of the second side is connected to the second opposite end of the third side by means of a second hinge. The second opposite end of the first side is connected to the second opposite end of the fourth side by means of a third hinge. The first end of the second side is connected to the first end of the fourth side by means of a fourth hinge.

The third side is constructed to rotate on the first and second hinges only away from the first side. The fourth side is constructed to rotate on the third and fourth hinges only towards the first side. The third side and the fourth side are constructed to rotate until the first side engages the second side and the foldable plastic/composite utility enclosure is in a folded configuration. The folded plastic/composite utility enclosure when in a folded configuration has only 15 to 20 percent of the thickness compared to an unfolded configuration.

The first end of the first side and the first end of the second side are curved. The first end of the third side is positioned slideably over the first end of the first side and the first end of the fourth side is positioned slideably over the first end of the second side. The second opposite end of the first side abuts against the second opposite end of the fourth side and the second opposite end of the third side abuts against the second opposite end of the second side. The second opposite ends are angled.

Each end of each side has spaced-apart hinge members. Each hinge member has a central hole. Each hinge is formed of the hinge members and each hinge has a single hinge pin that extends through the central holes of the hinge members that form the hinge. Each hinge member is positioned in a housing. The housing has an open interior to help anchor the housing in the ground. Each edge of each side has a plurality of spaced-apart hinge members wherein hinge members on one side engage the hinge members on another side to form the hinge. One or more of the hinges may have a reversibly insertable locking pin that prevents the sides from rotating on the hinges and prevents the foldable plastic/composite utility enclosure from folding.

The foldable and/or collapsible plastic/composite utility enclosure of this invention can be made of any type of plastic or composite, preferably plastic imbedded with fibers such as carbon fibers, glass fibers, or ceramic fibers or imbedded with particles such as glass particles. The use of plastic/composite and various openings or cutouts makes the utility enclosure light weight. The hinges allow the utility enclosure to be folded flat for storage and transportation. The pairs of sides are symmetrical which facilitates manufacturing. The foldable plastic/composite utility enclosure is ideal for housing underground utilities. However, it can be used to house or contain any desired device.

The present invention provides of method of forming and assembling the foldable plastic and/or composite utility enclosure. Molds are provided to form the first side, the second side, the third side, and the fourth side. The molds are constructed to form a central hole in each hinge member. Material including plastic or composite suitable for molding is placed in the molds to form the sides. The central hole of the hinge member is molded with two molding parts, wherein one or both of the molding parts have a solid central portion that forms the central hole. The sides are removed from the molds after the curing of the plastic in the molds. The sides are assembled to form the utility enclosure while the sides are still hot from the molding process and the hinge pins are inserted into the central holes of the hinge members to form the hinges to prevent the sides from warping during cooling. Assembling the sides and inserting hinge pins to form the utility enclosure is completed within approximately 10 minutes after removing the sides from the molds. The plastic used to form the sides is, preferably, a glass fiber-reinforced thermoplastic. The thermoplastic is, preferably, polypropylene.

DETAILED DESCRIPTION OF THE INVENTION

While the following description details the preferred embodiments of the present invention, it is to be understood that the invention is not limited in its application to the details of arrangement of the parts or the illustrations disclosed herein, since the invention is capable of other embodiments and of being practiced in various ways.

Figure 1:
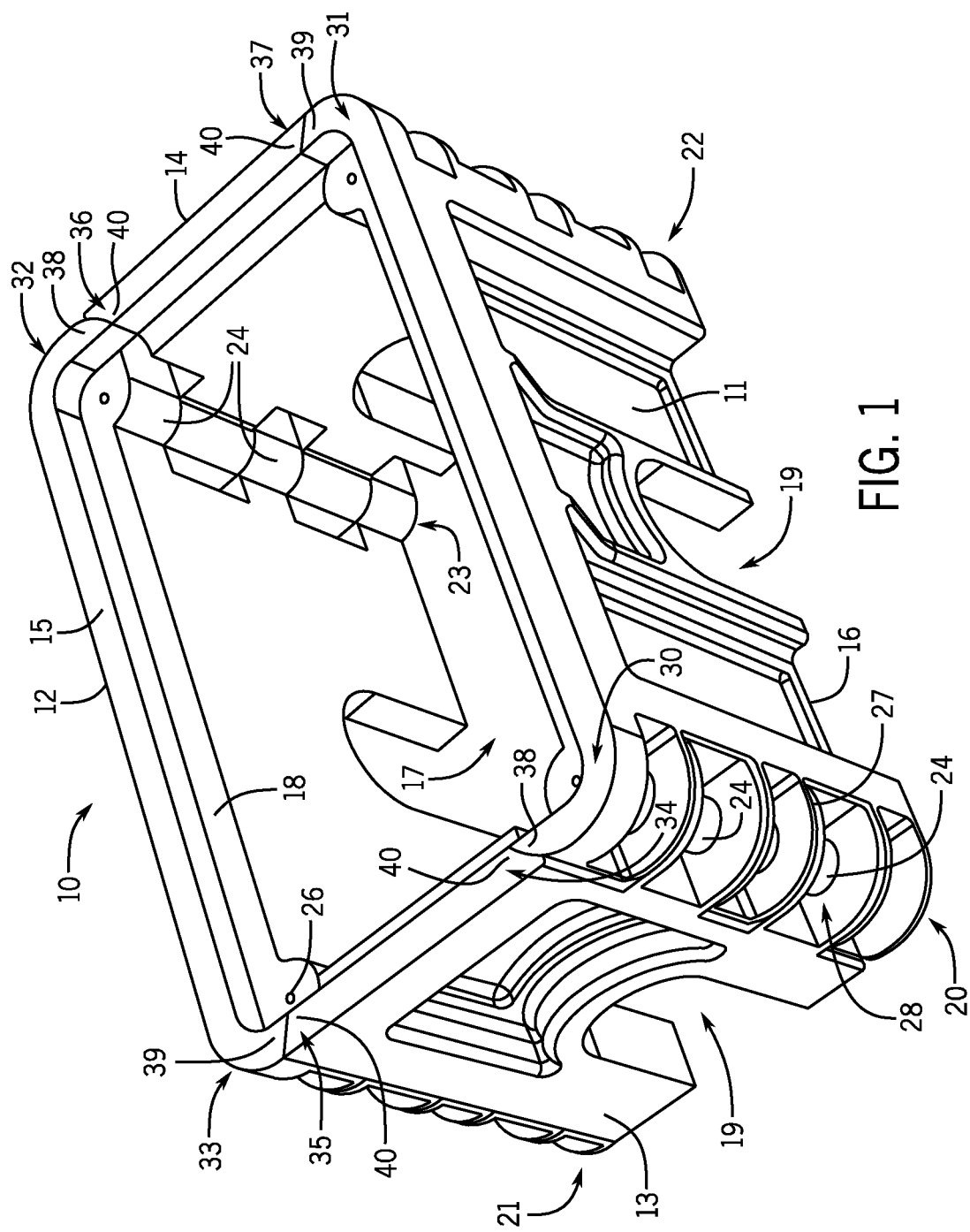
FIG. 1 is a top, front, perspective view of the utility enclosure of the present invention.

FIG. 1 is a top, front, perspective view of the utility enclosure 10 of the present invention. The utility enclosure 10 is rectangular and has a first side 11, a second side 12 opposite the first side 11, a third side 13, and a fourth side 14 opposite the third side 13. The first side 11 and the second side 12 form a first pair of sides and the third side 13 and the second side 14 form a second pair of sides. The utility enclosure 10 has a top end 15, a bottom end 16, and an interior 17. An interior ledge 18 is formed on each side in the interior 17 near the top end 15 to support a cover (see FIGS. 11 and 12). The edges of each side 11, 12, 13, and 14 are joined together with hinges 20, 21, 22, and 23 to form the rectangular utility enclosure 10, with a hinge in each corner of the rectangle. The hinges 20, 21, 22, and 23 are made up of hinge members 24. Each hinge member 24 has a central hole 25 (see FIGS. 2A and 2B) for the insertion of a hinge pin 26 to form the hinge, as is known in the art. The hinge members 24 are formed in open hollow housings 27, the housings 27 having interiors 28.

First side 11 has a first end 30 and a second opposite end 31. The second side 12 has a first end 32 and a second opposite end 33. The third side 13 has a first end 34 and a second opposite end 35. The fourth side 14 has a first end 36 and a second opposite end 37. The first ends 30 and 32 of the sides 11 and 12 (first pair of sides) form curved corners which end with curved extensions 38. The second opposite ends 31 and 33 of sides 11 and 12 are also curved and form acute angles 39. The first ends 34 and 36 of sides 13 and 14 (second pair of sides) and the second opposite ends 35 and 37 of sides 13 and 14 form obtuse angles 40. The first ends 34 and 36 of the sides 13 and 14 fit over the curved extensions 38 of sides 11 and 12 and the first ends 34 and 36 may be slightly curved to match the curved extensions 38. The second opposite end 35 of the third side 13 forms an obtuse angle 40 between an interior surface 45 (see FIG. 3B) of the third side 13 and an interior surface 42 (see FIG. 2B) of the first side 11. The obtuse angle 40 extends from the top end 15 of the utility enclosure 10 to the bottom end 16 of the utility enclosure 10. The second opposite end 37 of the fourth side 14 forms an acute angle 39 between an interior surface 45A of the fourth side 14 and an interior surface 42 of the first side 11 and the acute angle 39 extends from the top end 15 of the utility enclosure 10 to the bottom end 16 of the utility enclosure 10. The angled edges of the second opposite ends 35 and 37 of sides 13 and 14 abut the angled edges of the ends 31 and 33 of the sides 11 and 12. The sides 11, 12, 13, and 14 may have openings 19 to accommodate wires, pipes, tubing, and the like.

Figure 2A:
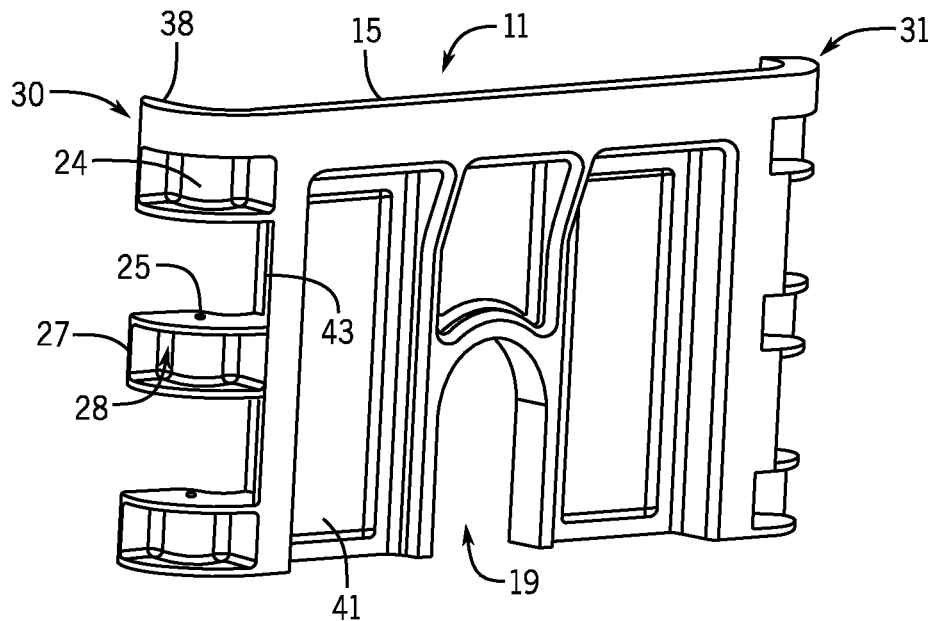
FIG. 2A is perspective view from an exterior surface of a first side the utility enclosure.
Figure 2B:
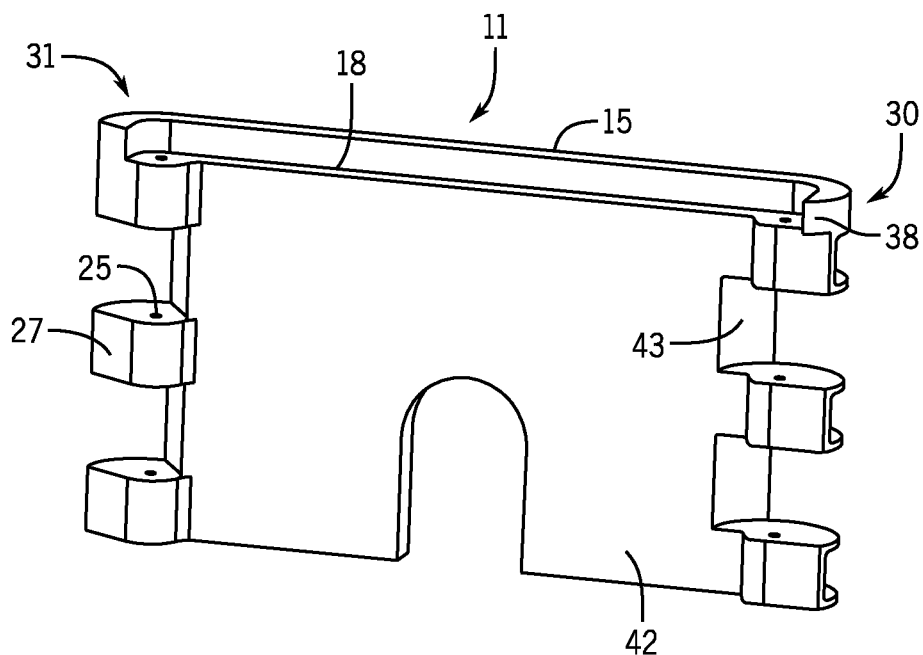
FIG. 2B is a perspective view from an interior surface of the first side.

FIG. 2A is perspective view from an exterior surface 41 of the first side 11, separated from the utility enclosure 10, and FIG. 2B is a perspective view from an interior surface 42 of the first side 11. The hinge members 24, the housings 27, and the interiors 28 can be seen in more detail. Grooves or spaces 43 between the hinge members 24 accommodate the housings 27 of the hinge members 24 that engage the first side 11 to complete the formation of the hinges 23.

Figure 3A:
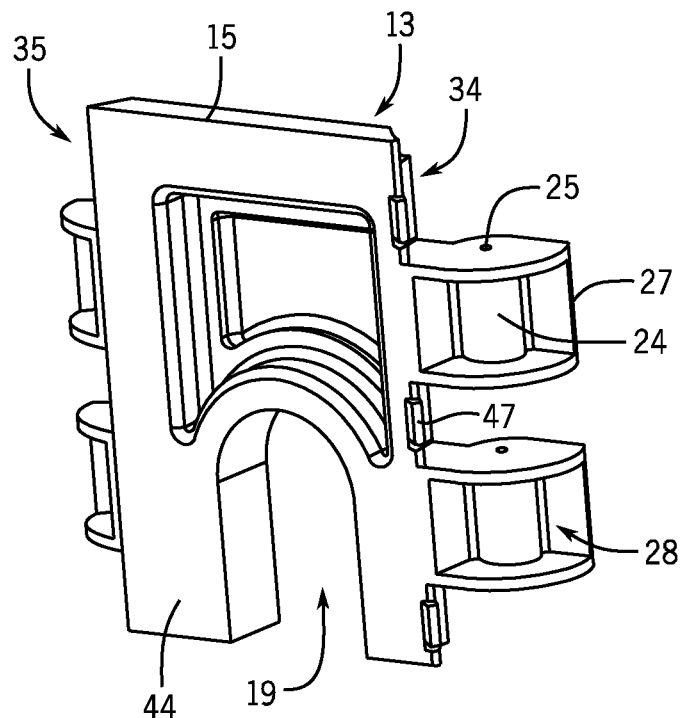
FIG. 3A is perspective view from an exterior surface of a third side.
Figure 3B:
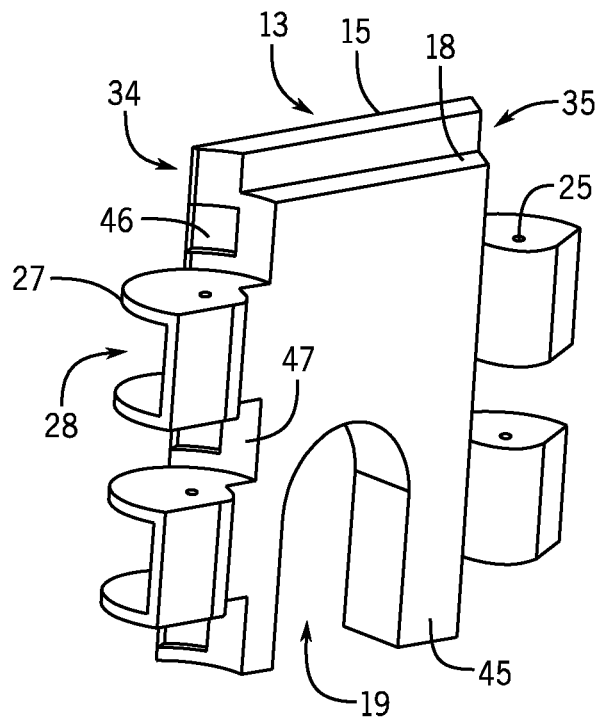
FIG. 3B is a perspective view from an interior surface of the third side.

FIG. 3A is perspective view from an exterior surface 44 of the third side 13 separated from the utility enclosure 10 and FIG. 3B is a perspective view from an interior surface 45. The hinge members 24, the housings 27, and the interiors 28 can be seen in more detail. FIGS. 3A and 3B further show latches 46 which lock the third side 13 to the first side 11 to prevent the utility enclosure 10 from folding. Grooves 47 between the hinge members 24 accommodate the housings 27 of the hinge members 24 that engage the third side 13 to complete the formation of the hinges 20, 21, 22, 23.

The housings 27 strengthen the hinges 20, 21, 22, 23 and protect them from external forces. When the utility enclosure 10 is placed in the ground to protect an underground device, soil, rocks, and cement can fill the interiors 28 of the housings 27 which will prevent the utility enclosure 10 from moving or folding. The first side 11 and the second side 12 are identical to each other and the third side 13 and the fourth side 14 are identical to each other, including with regard to hinging and folding features.

Figure 4:
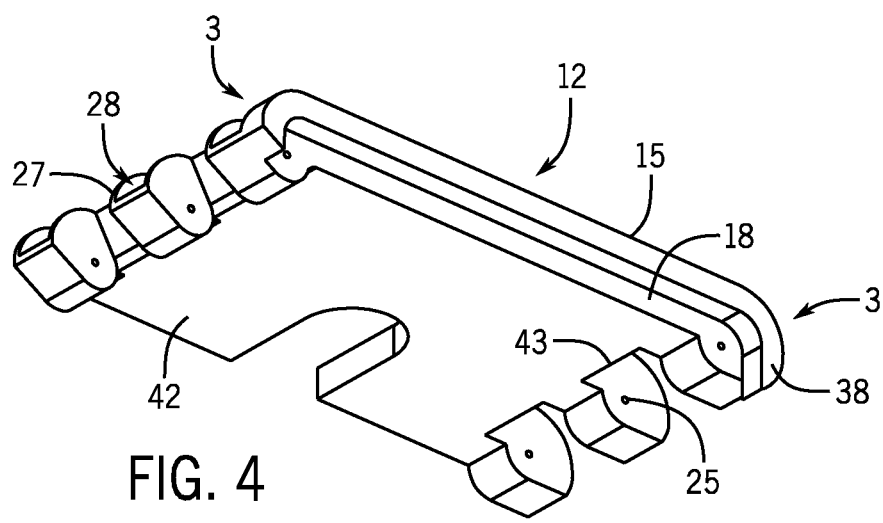
FIG. 4 is a top, interior surface view of the second side of the utility enclosure.
Figure 5:
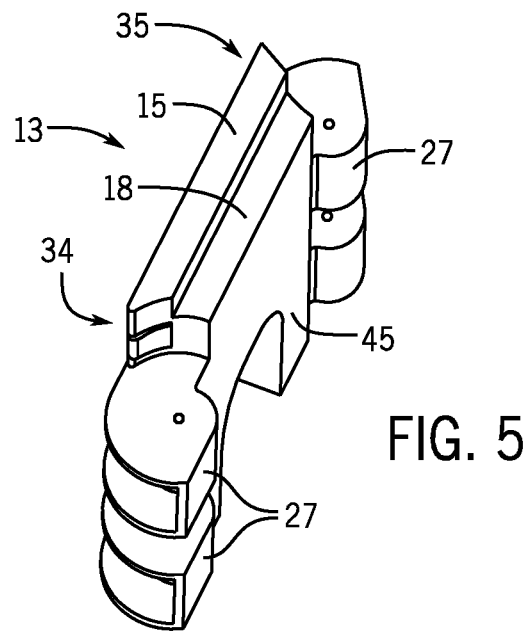
FIG. 5 is a top, interior surface view of the third side of the utility enclosure.
Figure 6:
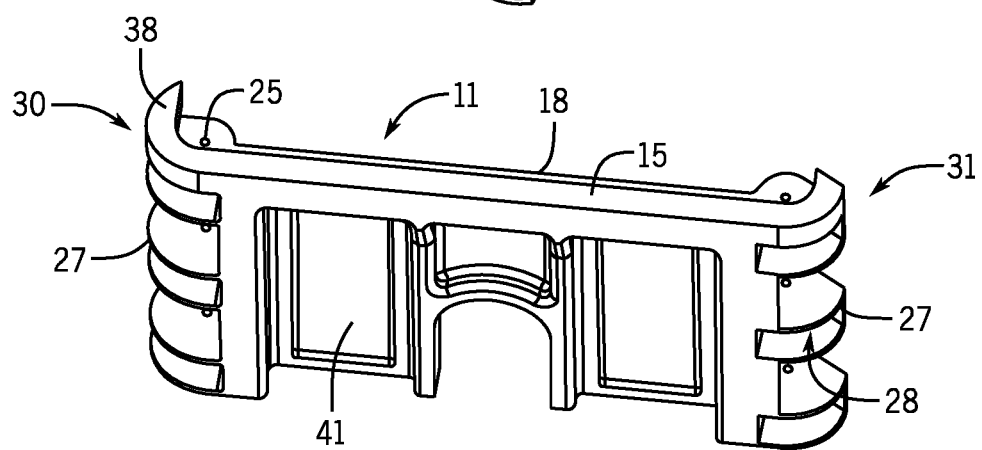
FIG. 6 is a top, exterior surface view of the first side of the utility enclosure.

FIG. 4 is a top, interior surface view of the second side 12. FIG. 5 is a top, interior surface view of the third side 13. FIG. 6 is a top, exterior surface view of the first side 11. The utility enclosure 10 is formed by inserting the housings 27 on end 35 of the third side 13 in between the housings 27 on end 31 of the second side 12 and inserting the housings 27 on end 34 of the third side 13 in between the housings 27 on end 30 of the first side 11. The pins 26 are then inserted through the holes 25 to form the hinges 20, 21, 22, 23. The fourth side 14 is added to sides 11 and 12 in the same way to complete the assembly of the utility enclosure 10.

Figure 7A:
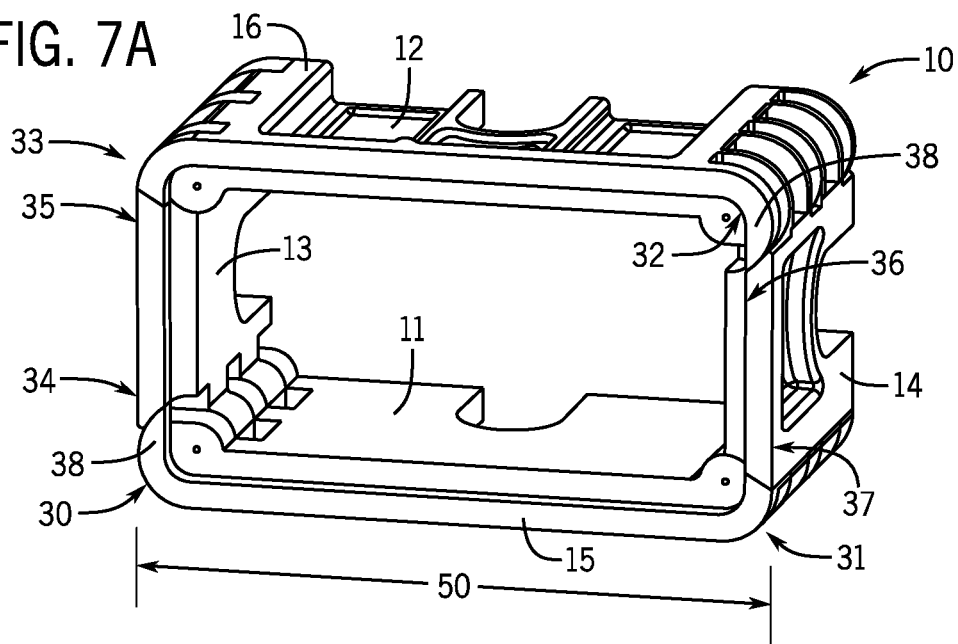
FIG. 7A is a top perspective view of the utility enclosure laying with its first side on a horizontal plane in an unfolded configuration.
Figure 7B:
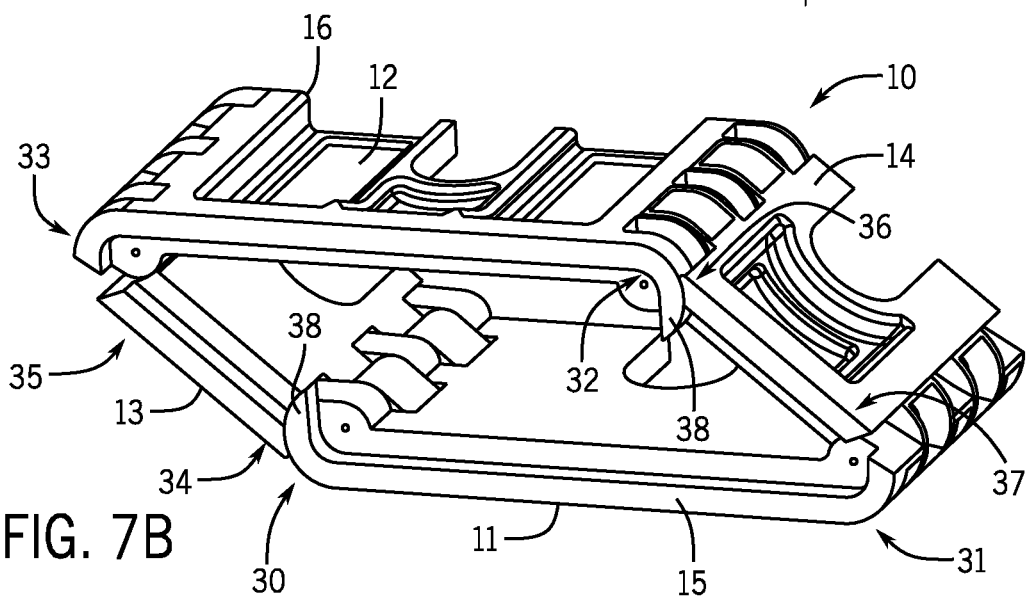
FIG. 7B shows the utility enclosure of FIG. 7A in a semi-folded configuration.
Figure 7C:
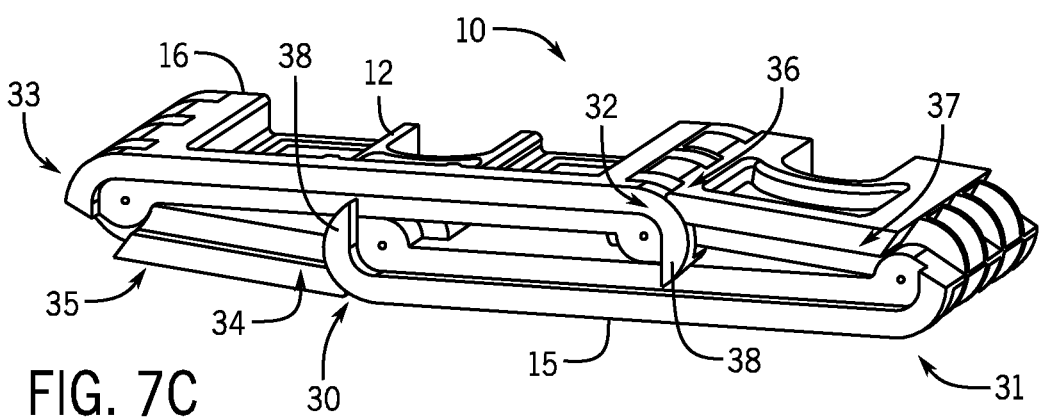
FIG. 7C shows the utility enclosure of FIG. 7A in a completely folded configuration.

FIG. 7A is a top perspective view of the utility enclosure 10 laying with its first side 11 on a horizontal plane, shown by double arrow 50. The utility enclosure 10 is in an unfolded configuration. FIG. 7B shows the utility enclosure 10 in a semi-folded configuration. FIG. 7C shows the utility enclosure 10 in a completely folded configuration. As the second side 13 is rotated away from the first side 11 the fourth side 14 is rotated towards the first side 11. The second side 12 moves inward towards the first side 11. In the folded configuration the utility enclosure 10 has about 15% to 25% of the thickness, compared to the unfolded configuration, preferably about 20%.

Figure 8A:
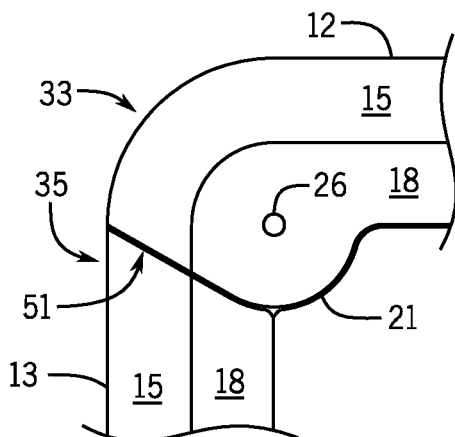
FIG. 8A shows an enlarged top view of an end of a second side and an end of the third side in an unfolded configuration.
Figure 8B:
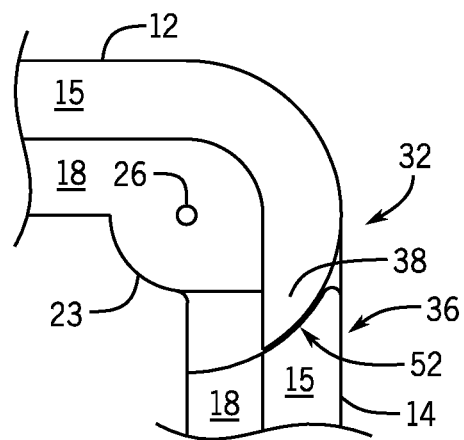
FIG. 8B show an enlarged top view of the end of the second side and an end of a fourth side in an unfolded configuration.

FIG. 8A shows an enlarged top view of the end 33 of the second side 12 and the end 35 of the third side 13 in an unfolded configuration. FIG. 8B shows an enlarged top view of the end 32 of the second side 12 and the end 36 of the fourth side 14 in an unfolded position. The utility enclosure 10 cannot fold in a direction opposite to that shown in FIGS. 9A, 9B, 10A, and 10C because the end 35 of side 13 abuts the end 33 of side 12, shown by arrow 51, at an angle relative to sides 12 and 13. The end 35 of side 13 cannot move around the end 33 of side 12. However, the end 36 of side 14 can move around end 32 of side 12, as shown in FIGS. 9A, 9B, 10A, and 10C, because end 36 overlaps end 32, shown by arrow 52.

Figure 9A:
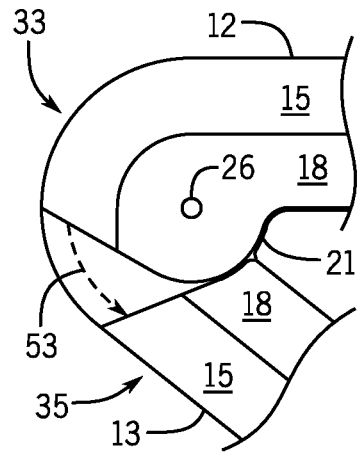
FIGS. 9A and 9B show the same views as 8A and 8B but with the utility enclosure in a semi-folded configuration.
Figure 9B:
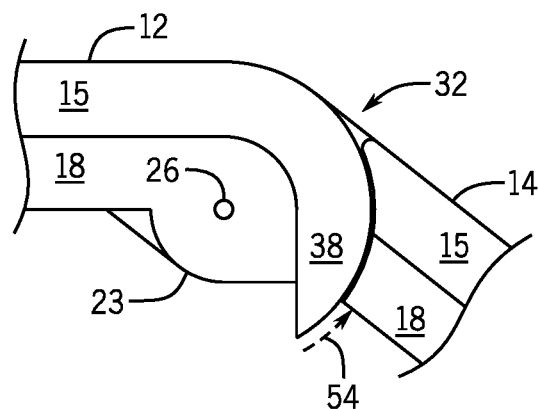
Figure 10A:
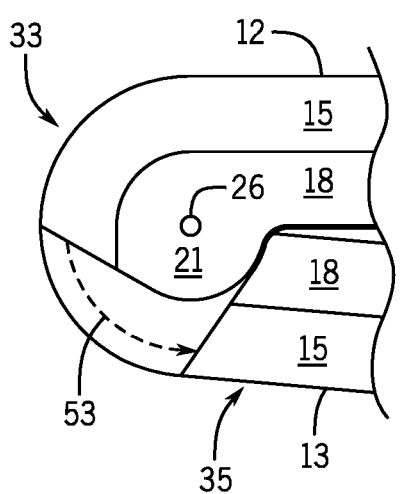
FIGS. 10A and 10B show the same views 8A and 8B but with the utility enclosure in a completely folded configuration.
Figure 10B:
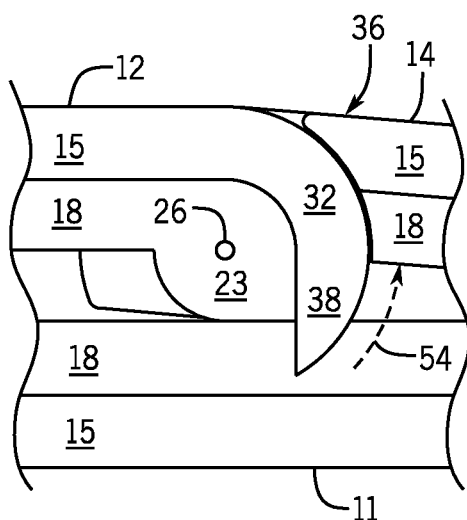

FIGS. 9A and 9B show the same views as FIGS. 8A and 8B but with the utility enclosure 10 in a semi-folded configuration. Arrow 53 in FIG. 9A shows the extent to which end 35 of side 13 has moved away from end 33 of side 12. Arrow 54 in FIG. 9B shows the extent to which end 36 of side 14 has moved over and around the curved extension 38 of end 32 of side 12. FIGS. 10A and 10B show the same views as FIGS. 8A and 8B but with the utility enclosure 10 in a completely folded configuration with the first side 11 engaging the second side 12. The folding of the utility enclosure 10 is reversible and the utility enclosure 10 can be restored to its unfolded configuration by pulling the first side 11 and the second side 12 apart.

Figure 11:
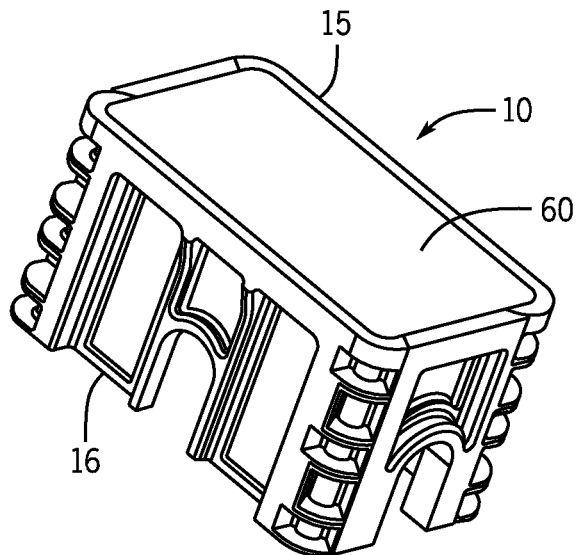
FIG. 11 shows a top perspective view of the utility enclosure with a top cover inserted in a top end of the utility enclosure.
Figure 12:
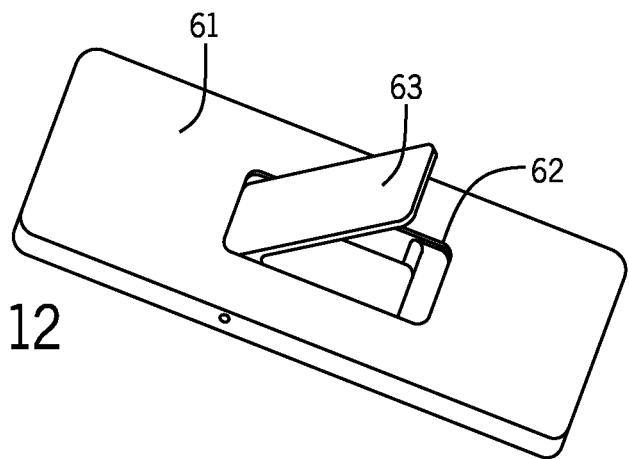
FIG. 12 shows a top perspective view of the top cover having an opening with a door.

FIG. 11 shows a top perspective view of the utility enclosure 10 with a top cover 60 inserted in the top end 15. The top cover 60 can have handles or openings for removing the cover 60. FIG. 12 shows a top perspective view of a top cover 61 having an opening 62 with a door 63. The interior 17 of the utility enclosure 10 can be viewed and accessed by raising the door 63.

Figure 13:
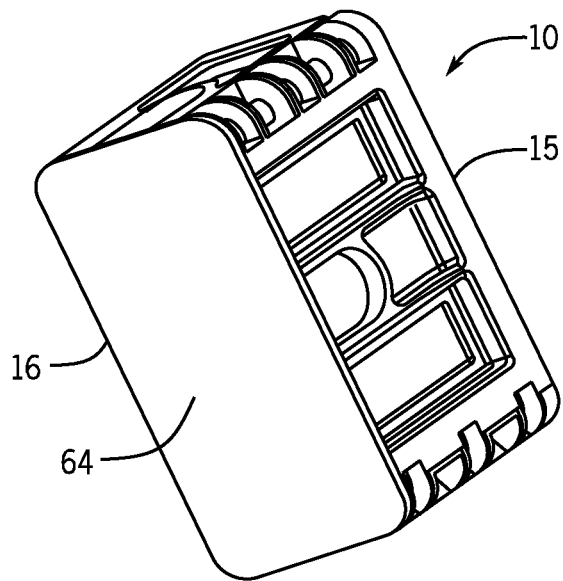
FIG. 13 shows a bottom perspective view of the utility enclosure with a bottom cover attached reversibly to a bottom end of the utility enclosure.

FIG. 13 shows a bottom perspective view of the utility enclosure 10 with a bottom cover 64 attached reversibly to the bottom end 16 by methods known in the art. The use of a bottom cover 64 allows the utility enclosure 10 to be used as any type of utility enclosure for any type of articles.

Figure 14:
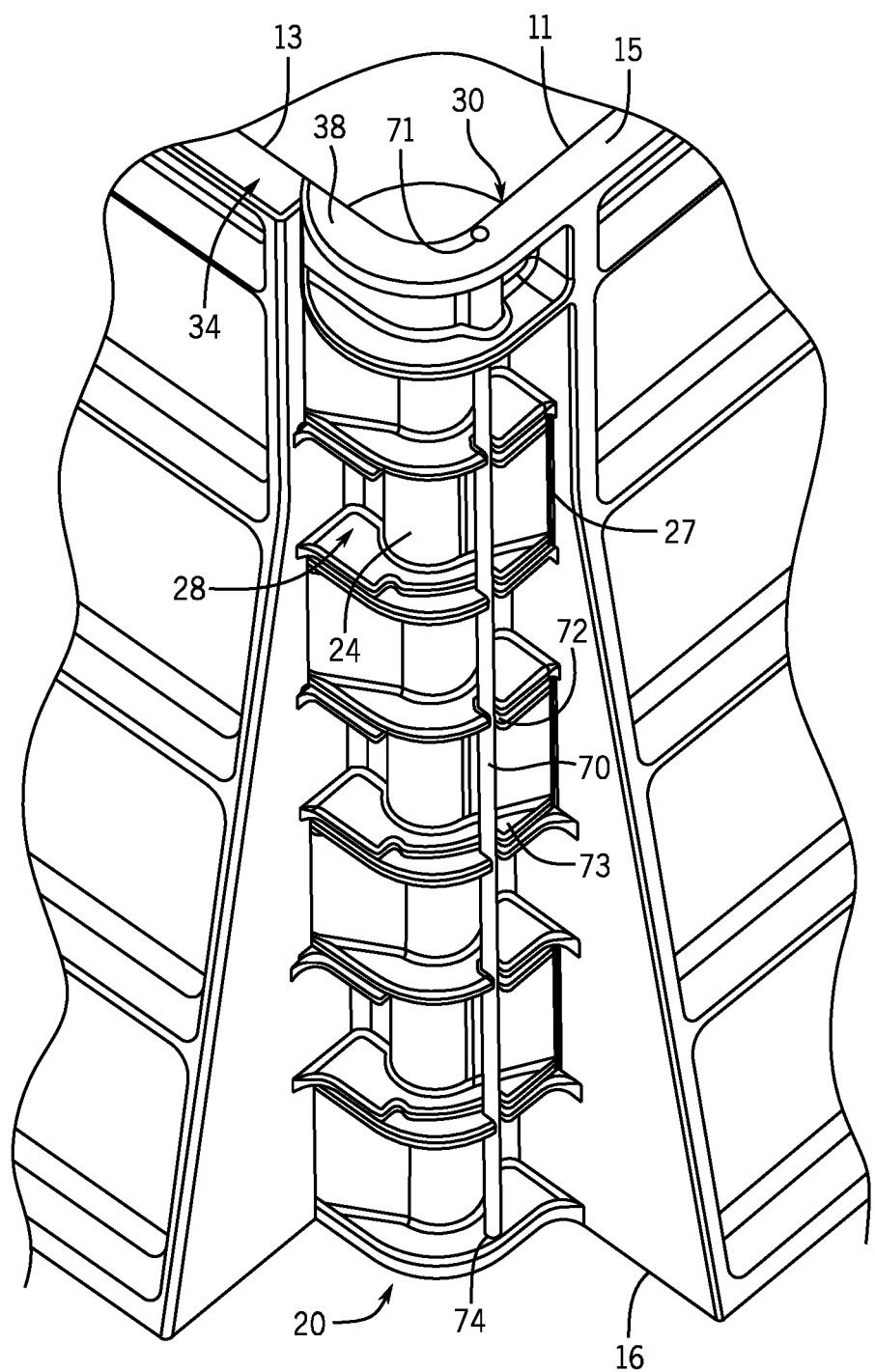
FIG. 14 shows a perspective view of corner with a hinge connecting two sides, with a locking pin inserted through the hinge members to prevent rotation of the sides on the hinge and to prevent folding of the foldable plastic utility enclosure.

FIG. 14 shows a perspective view of corner with a hinge connecting two sides, with a locking pin 70 inserted through the hinge members 24 to prevent rotation of the sides on the hinge and to prevent folding of the foldable plastic/composite utility enclosure. An insertion hole 71 is on the top end 15 to insert the locking pin 70. Each hinge member 24 has an upper groove 72 and a bottom groove 73 through which the locking pin 70 passes. The locking pin 70 can be retained in an opening 74 in the bottom hinge member.

The sides 11, 12, 13, and 14 of the utility enclosure 10 are formed separately in molds. The plastic material forming the side hardens in the mold within a few minutes. The side is hot when it comes out of the mold and the temperature of the side can range from 180 to in excess of 250 degrees F. The outer surface of the side is hardened but the interior part of the side can still be molten. In a standard procedure, each side is removed from the mold and allowed to cool. As the side begins to cool it will start to warp immediately which renders the side useless. To prevent warping of the side, the side may be placed in a cooling rack immediately after it comes out of the mold. The cooling rack holds the side in a fixed configuration until the internal plastic is solidified and the temperature has cooled below 180 degrees F. The cooling rack prevents the side from warping but the side has to remain in the cooling rack for up to 60 minutes. This amount of time makes the manufacturing process impractical.

Another problem arises when drilling a central hole 25 in the hinge member 24 for insertion of a hinge pin 26. Since the hinge members are made of glass-reinforced thermoplastic the time required to drill the central hole in the hinge member is up to 20 minutes. In addition, the drill bit wears out after three or four holes are drilled. This amount of time and wearing out of the drill bit also makes the manufacturing process impractical.

Figure 15:
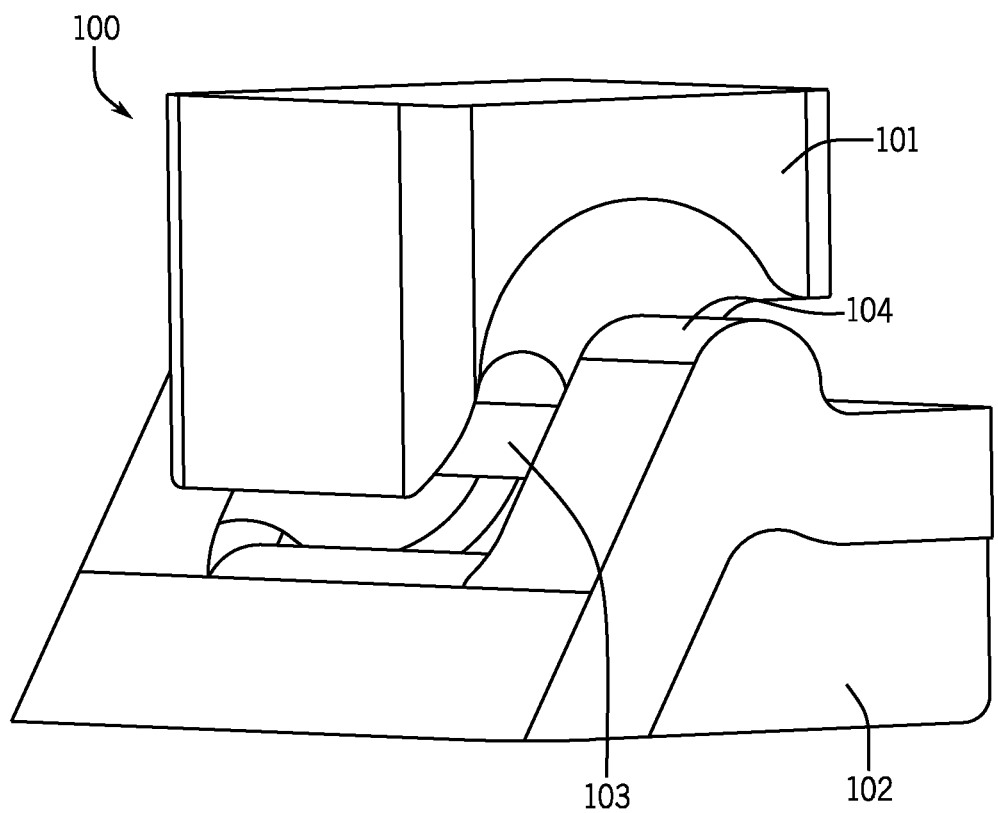
FIG. 15 shows two molding parts which form the hinge member and form a central hole in the hinge member when a side is being formed in a molding process.

In order to overcome these manufacturing problems, the mold was designed to form the central hole in the hinge member during the molding process of the side. FIG. 15 shows two molding parts 101 and 102 of a mold 100, wherein the two molding parts 101 and 102 form the hinge member. Part 101 has a solid central portion 103 that forms the central hole in the hinge member. Likewise, part 102 has a solid central portion 104 that forms the central hole in the hinge member. The combination of central holes, formed by part 101 and part 102 and extended across the plurality of spaced apart hinge members, forms the hinge. With the hinge member reduced in mass, the cooling time in the mold is reduced. At the end of curing in the molds, the sides are removed from the molds with the central hole formed in the hinge member. The utility enclosure can be assembled with the hinge pins inserted in the central holes of the hinge members, within about 10 minutes after removing the sides from the molds. Assembling the utility enclosure and inserting the hinge pins in the hinge members while the sides are still hot from the molding process surprisingly prevent the sides from warping during cooling. In addition, the utility enclosures can be allowed to cool in the folded configuration to facilitate shipping or storage.

The material used to form the sides can be any polymer or any composite, preferably a glass fiber-reinforced thermoplastic or a thermoplastic polymer-graphene composite. The thermoplastic is, preferably, polypropylene. Glass fiber-reinforced polypropylene has improved dimensional stability, reduced warpage, increased rigidity, and increased strength. Heat deflection temperature at 264 psi is increased up to 300° F. (150° C.) for 40% glass fiber reinforced polypropylene. Polypropylene's coefficient of thermal expansion is cut in half with 40% glass reinforcement. Glass fiber-reinforced polypropylene has good impact strength, very good mold filling capability, excellent stiffness, good dimensional stability, and low creep under load at elevated temperatures (RTP Company, Winona, Minn.).

The foregoing description illustrates and describes the disclosure. Additionally, the disclosure shows and describes only the preferred embodiments but, it is to be understood that the preferred embodiments are capable of being formed in various other combinations, modifications, and environments and are capable of changes or modifications within the scope of the invention concepts as expressed herein, commensurate with the above teachings and/or the skill or knowledge of the relevant art. The embodiments described herein above are further intended to explain the best modes known by applicant and to enable others skilled in the art to utilize the disclosure in such, or other, embodiments and with the various modifications required by the particular applications or uses thereof. Accordingly, the description is not intended to limit the invention to the form disclosed herein. Also, it is intended that the appended claims be construed to include alternative embodiments. It will be further understood that various changes in the details, materials, and arrangements of the parts which have been described and illustrated above in order to explain the nature of this invention may be made by those skilled in the art without departing from the principle and scope of the invention as recited in the following claims.

We claim:

1. A method of forming a foldable plastic and/or composite enclosure, wherein the foldable plastic and/or composite enclosure comprises:
    a) a first side, a second side opposite the first side, a third side, and a fourth side opposite the third side, each of said sides having a first end and a second opposite end; and
    b) the first end of the first side connected to the first end of the third side by means of a first hinge; the second opposite end of the second side connected to the second opposite end of the third side by means of a second hinge; the second opposite end of the first side connected to the second opposite end of the fourth side by means of a third hinge; and the first end of the second side connected to the first end of the fourth side by means of a fourth hinge,
        wherein each end of each side has a plurality of spaced-apart hinge members,
        wherein each hinge member has a central hole,
        wherein each hinge is formed of the spaced-apart hinge members, and
        wherein each hinge has a single hinge pin that extends through the central holes of the spaced-apart hinge members that form the hinge,
    the method comprising:
    a) providing molds to form the first side, the second side, the third side, and the fourth side, wherein the molds are constructed to form a central hole in each hinge member;
    b) providing a material suitable for molding and placing the material in molds to form the sides;
    c) removing the sides from the molds after the curing of the material in the molds; and
    d) assembling the sides to form the utility enclosure while the sides are still hot from the molding process and inserting hinge pins into the central holes of the spaced-apart hinge members to form the hinges to prevent the sides from warping during cooling of the utility enclosure.

2. The method of claim 1, further comprising molding the central hole of the hinge member with two molding parts, wherein one molding part or both molding parts have a solid central portion that forms the central hole.

3. The method of claim 1, wherein assembling the sides and inserting hinge pins is completed within approximately 10 minutes of removing the sides from the molds.

4. The method of claim 1, wherein the material is a glass fiber-reinforced composite.

5. The method of claim 1, wherein the material is polypropylene.

6. The method of claim 1, wherein the material is a thermoplastic polymer-graphene composite.

7. The method of claim 1, wherein the material is a polymer or a composite.

8. A method of forming a foldable plastic and/or composite enclosure, wherein the foldable plastic and/or composite enclosure comprises:
    a) a first side, a second side opposite the first side, a third side, and a fourth side opposite the third side, each of said sides having a first end and a second opposite end; and
    b) the first end of the first side connected to the first end of the third side by means of a first hinge; the second opposite end of the second side connected to the second opposite end of the third side by means of a second hinge; the second opposite end of the first side connected to the second opposite end of the fourth side by means of a third hinge; and the first end of the second side connected to the first end of the fourth side by means of a fourth hinge,
        wherein each end of each side has a plurality of spaced-apart hinge members,
        wherein each hinge member has a central hole,
        wherein each hinge is formed of the spaced-apart hinge members, and
        wherein each hinge has a single hinge pin that extends through the central holes of the spaced-apart hinge members that form the hinge,
    the method comprising:
    a) providing a mold or molds to form the first side, the second side, the third side, and the fourth side, wherein the mold or molds are constructed to form a central hole in each hinge member;
    b) providing a plastic or composite suitable for molding and placing the plastic or composite in the mold or molds to form the sides;
    c) molding the central hole of the hinge member with two molding parts, wherein one molding part or both molding parts have a solid central portion that forms the central hole;
    d) removing the sides from the molds after the curing of the plastic in the molds; and
    e) assembling the sides to form the utility enclosure while the sides are still hot from the molding process and inserting hinge pins into the central holes of the spaced-apart hinge members to form the hinges to prevent the sides from warping during cooling of the utility enclosure.

9. The method of claim 8, wherein assembling the sides and inserting hinge pins is completed within approximately 10 minutes of removing the sides from the molds.

10. The method of claim 8, wherein the composite is a glass fiber-reinforced thermoplastic composite.

11. The method of claim 10, wherein the thermoplastic is polypropylene.

12. The method of claim 8, wherein the composite is a polymer-graphene composite, and the polymer is a thermoplastic.

13. The method of claim 8, wherein the plastic is a polymer.

14. A method of forming a foldable plastic and/or composite enclosure, wherein the foldable plastic and/or composite enclosure comprises:
   a) a first side, a second side opposite the first side, a third side, and a fourth side opposite the third side, each of said sides having a first end and a second opposite end; and
   b) the first end of the first side connected to the first end of the third side by means of a first hinge; the second opposite end of the second side connected to the second opposite end of the third side by means of a second hinge; the second opposite end of the first side connected to the second opposite end of the fourth side by means of a third hinge; and the first end of the second side connected to the first end of the fourth side by means of a fourth hinge,
      wherein each end of each side has a plurality of spaced-apart hinge members,
      wherein each hinge member has a central hole,
      wherein each hinge is formed of the spaced-apart hinge members, and
      wherein each hinge has a single hinge pin that extends through the central holes of the spaced-apart hinge members that form the hinge, the method comprising:
   a) providing molds to form the first side, the second side, the third side, and the fourth side, wherein the molds are constructed to form a central hole in each hinge member;
   b) providing a plastic or composite suitable for molding and placing the plastic or composite in molds to form the sides;
   c) molding the central hole of the hinge member with two molding parts, wherein one molding part or both molding parts have a solid central portion that forms the central hole;
   d) removing the sides from the molds after the curing of the plastic in the molds; and
   e) assembling the sides to form the utility enclosure while the sides are still hot from the molding process and inserting hinge pins into the central holes of the spaced-apart hinge members to form the hinges to prevent the sides from warping during cooling of the utility enclosure, wherein assembling the sides and inserting hinge pins is completed within approximately 10 minutes of removing the sides from the molds.

15. The method of claim 14, wherein the composite is a glass fiber-reinforced thermoplastic composite.

16. The method of claim 15, wherein the thermoplastic is polypropylene.

17. The method of claim 14, wherein the composite is a polymer-graphene composite and the polymer is a thermoplastic.

18. The method of claim 14, wherein the plastic is a polymer.

* * * * *